(12) United States Patent
Trettin et al.

(10) Patent No.: US 7,438,084 B2
(45) Date of Patent: Oct. 21, 2008

(54) TRANSPORT SYSTEM FOR TANKS

(75) Inventors: David J. Trettin, Atlanta, GA (US); Jon Aaron Schlosser, Cumming, GA (US); Mark Allen Catron, Atlanta, GA (US)

(73) Assignee: Irwin Industrial Tool Company, Huntersville, NC (US)

( * ) Notice: Subject to any disclaimer, the term of this patent is extended or adjusted under 35 U.S.C. 154(b) by 440 days.

(21) Appl. No.: 10/906,722

(22) Filed: Mar. 3, 2005

(65) Prior Publication Data

US 2006/0196548 A1 Sep. 7, 2006

(51) Int. Cl.
*B62B 1/26* (2006.01)
*A47B 81/00* (2006.01)

(52) U.S. Cl. .................. 137/355.16; 239/172; 222/608

(58) Field of Classification Search ............ 137/355.16; 280/49.17, 49.18, 49.19; 222/608, 610; 239/172
See application file for complete search history.

(56) References Cited

U.S. PATENT DOCUMENTS

| | | | |
|---|---|---|---|
| 1,244,030 A | 10/1917 | Cave | |
| 1,432,037 A | 10/1922 | Russell | |
| 2,131,673 A | 9/1938 | Robinson | |
| 4,066,156 A | 1/1978 | Basile | |
| 4,253,716 A | 3/1981 | Turner, Jr. | |
| 4,573,665 A | 3/1986 | Strohl et al. | |
| 4,625,949 A | 12/1986 | Walker | |
| 5,013,055 A * | 5/1991 | Labrum | 280/47.19 |
| 5,492,346 A | 2/1996 | Stadler et al. | |
| 5,570,895 A | 11/1996 | McCue et al. | |
| 5,797,612 A * | 8/1998 | Buccioni | 280/47.26 |
| 5,799,958 A * | 9/1998 | Bishop | 280/47.26 |
| 5,816,499 A * | 10/1998 | Christiansen | 239/198 |
| 5,961,134 A * | 10/1999 | Congleton et al. | 280/47.18 |
| 6,036,203 A * | 3/2000 | Tyus et al. | 280/47.26 |
| 6,047,983 A | 4/2000 | Day, III | |
| 6,116,623 A | 9/2000 | Salvucci | |
| 6,131,925 A * | 10/2000 | Weldon | 280/47.18 |
| 6,186,520 B1 * | 2/2001 | Barten | 280/47.18 |
| 6,334,622 B1 | 1/2002 | Romero | |

(Continued)

OTHER PUBLICATIONS

PCT International Search Report for corresponding PCT Application No. PCT/US06/06930 dated Oct. 12, 2007.

(Continued)

*Primary Examiner*—John Rivell
*Assistant Examiner*—Cloud K Lee
(74) *Attorney, Agent, or Firm*—Dannis J. Williamson; Matthew W. Witsil; Moore & Van Allen

(57) ABSTRACT

A tank transport system consisting of a wheeled cart having compartments for holding tanks includes a hose compartment that stores the hoses for the tanks and other associated equipment. The hose compartment includes a flip down door that, in its open position, is disposed substantially horizontally and contains a number of storage slots for holding equipment. A hose storage rack is provided interior of the hose storage compartment for storing the hoses in a wound state. A number of storage areas are also included within the compartment including a bin formed within the hose rack. A pivotable handle is provided that is used to roll the cart on the wheels. Other storage compartments may also be provided external to the hose compartment.

20 Claims, 5 Drawing Sheets

U.S. PATENT DOCUMENTS

| | | | |
|---|---|---|---|
| 6,508,477 B2 | 1/2003 | Burkett | |
| 6,565,103 B2 | 5/2003 | Wilson | |
| 6,666,464 B1 * | 12/2003 | Mabry et al. | 280/43.17 |
| 6,702,608 B2 * | 3/2004 | Brennan, Jr. | 280/47.19 |
| 6,733,017 B2 | 5/2004 | Intravatola | |
| 7,338,054 B2 * | 3/2008 | Pint | 280/79.2 |
| 2001/0030403 A1 | 10/2001 | Johnson et al. | |
| 2004/0051264 A1 | 3/2004 | Koronowski et al. | |

OTHER PUBLICATIONS

PCT Written Opinion for corresponding PCT Application No. PCT/US06/06930 dated Oct. 12, 2007.

PCT International Preliminary Report on Patentability and Written Opinion corresponding to PCT Application No. PCT/US2006/006930 dated Nov. 6, 2007.

* cited by examiner

TRANSPORT SYSTEM FOR TANKS

BACKGROUND

The invention relates generally to pressurized liquid or gas storage tanks and more particularly to an improved transport system such tanks.

Tanks for storing and dispensing pressurized gas and/or liquid are commonly used in a wide variety of industrial, medical and other applications. A typical tank comprises a hollow cylinder made of steel or other rigid impermeable material that stores the gas or liquid under relatively high pressure. A valve assembly is in fluid flow communication with the tank and may include a regulator to control the flow of fluid from the tank and a gauge to monitor the fluid level and/or pressure. A supply hose is connected to the output port of the valve assembly for dispensing the fluid.

Often storage tanks are used in an environment where the fluid stored in the tank is used in conjunction with other equipment for performing a particular function. Example environments are plumbing, welding, HVAC and electrical work where a tank storing liquid fuel such as acetylene or propane is used with a tank storing oxygen. Such applications also require other related equipment and accessories such as brazing rods, pipe fittings, solder, flux, hand tools, torch heads or the like. Because the typical filled storage tanks are heavy and difficult to transport and a wide variety of related equipment may be required at the work site, it has been difficult for a worker to easily and conveniently transport the tanks and related accessories and equipment.

Thus, an improved transport system for use with pressurized tanks is desired.

SUMMARY OF THE INVENTION

The tank transport system of the invention consists of a wheeled cart having compartments for holding two tanks, for example an oxygen tank and an acetylene or propane tank. The cart further includes a compartment that stores the hoses for the tanks and other associated equipment. The hose compartment includes a flip down door that, in its open position, is disposed substantially horizontally and contains a number of storage slots for holding tools or other related equipment that are presented to the user for easy access. A hose rack is provided interior of the compartment for storing the hoses in a wound state. A number of storage bins are also included within the compartment including a bin formed within the hose rack. A pivotable handle is provided that moves between an extended position where it is used to roll the cart on the wheels and a retracted position where it is out of the way of the user during use of the tanks. Other storage compartments may also be provided external to the hose storage compartment.

DETAILED DESCRIPTION OF EMBODIMENTS OF THE INVENTION

Figure 7:
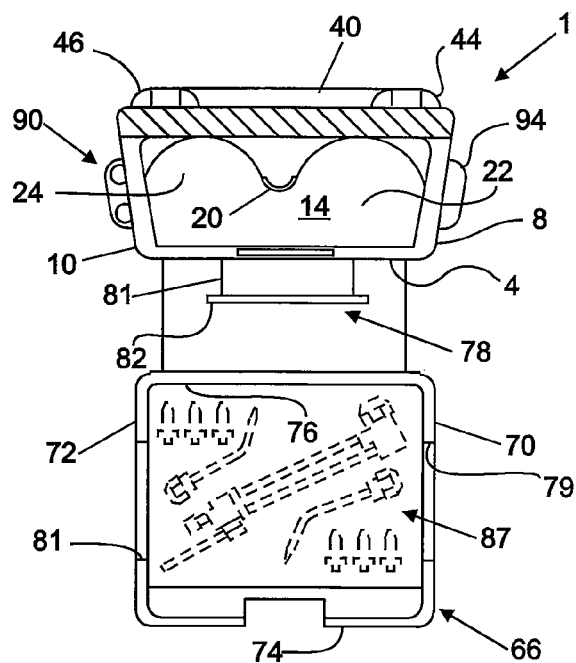
FIG. 7 is a section view taken along line 7-7 of FIG. 3 with the storage tanks removed.

The tank storage cart of the invention is shown generally at 1 and consists of a body portion 2 for storing the tanks comprising a front wall 4, back wall 6, a pair of side walls 8 and 10 and a bottom wall 12 that define a tank compartment 14. Referring to FIG. 7, tank compartment 14 is open at the top such that tanks, such as an acetylene or propane tank 16 and oxygen tank 18, can be inserted into the tank compartment through the open top. The inside surface of back wall 6 is formed with a protrusion 20 extending for the height of compartment 14 and extending into the interior of compartment 14 to define two tank receiving portions 22 and 24 each for receiving one of tanks 16 and 18. Because tanks 16 and 18 may be of different sizes protrusion 20 may be disposed laterally offset from the center of back wall 6 to create a larger tank receiving portion and a smaller tank receiving portion. Moreover, protrusion 20 could be arranged so as to extend between back wall 6 and front wall 4 such that the tank receiving portions 22 and 24 are completely separate from one another.

Back wall 6 includes a portion 30 that extends above the tops of tanks 16 and 18 and is connected to a cover portion 32 that extends from portion 30 over tanks 16 and 18. Cover portion 32 includes a hand grip 34 formed therein that can be gripped by a user to move the tank storage cart 1. A compartment 36 is formed in the top surface of cover portion 32 for retaining a striker that can be easily accessed during use of the tanks. The front wall 4, back wall 6, side walls 8 and 10, bottom wall 12 and cover portion 32 may be a unitary structure made of molded plastic.

Figure 2:
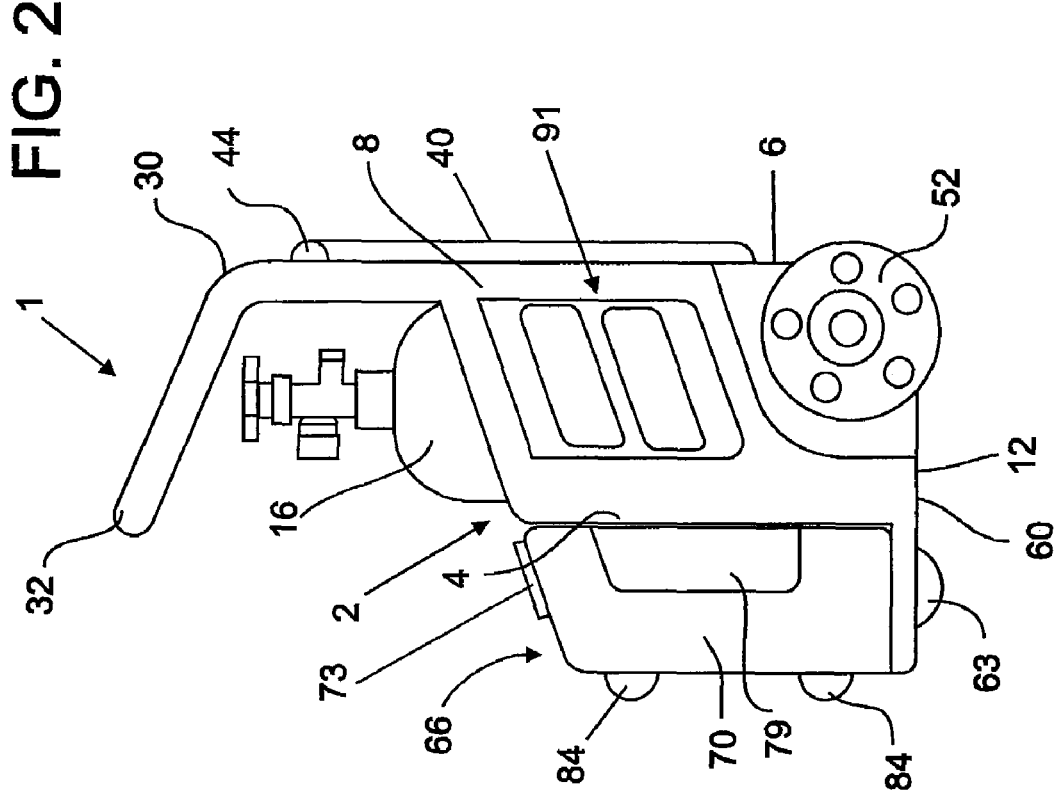
FIG. 2 is a side view of an embodiment of the tank storage cart of the invention.
Figure 6:
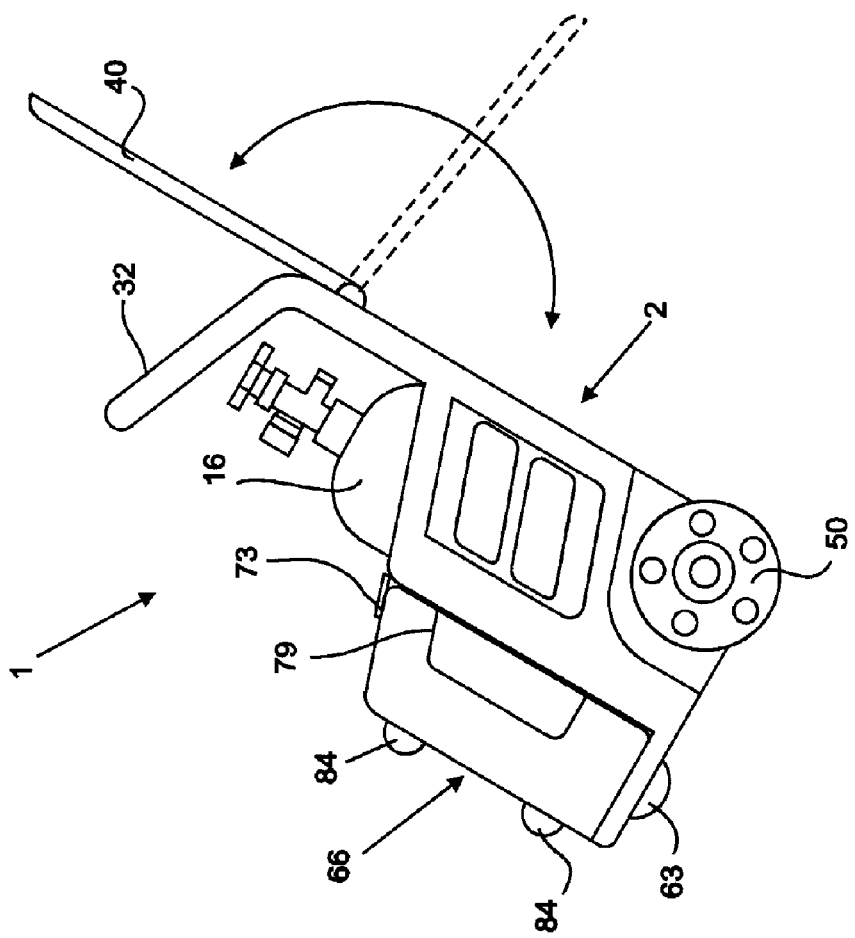
FIG. 6 is a side view of an embodiment of the tank storage cart of the invention in the rolling position.
Figure 5:
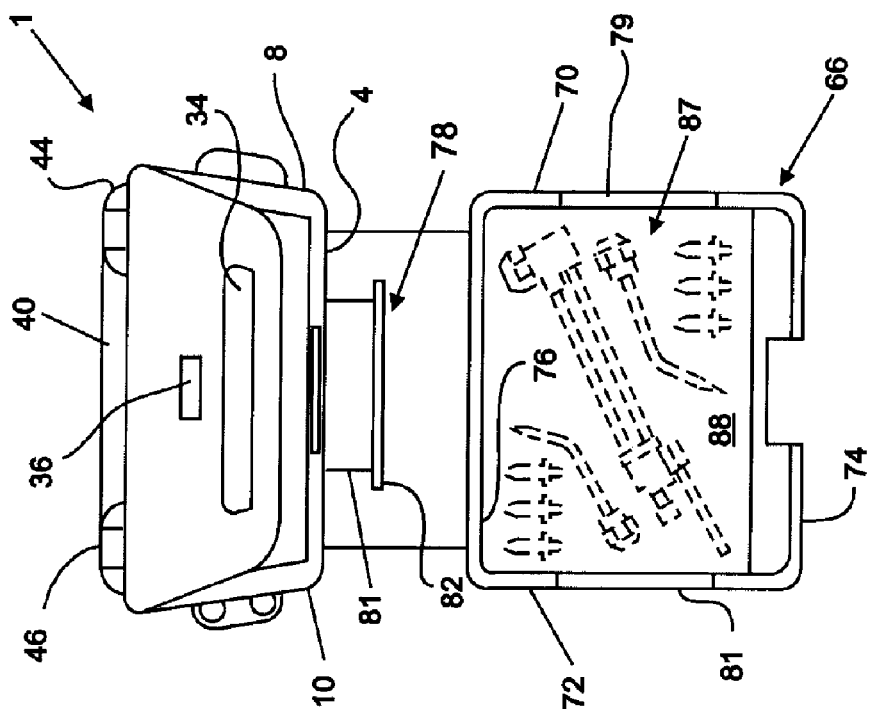
FIG. 5 is a top view of an embodiment of the tank storage cart of the invention with the hose compartment door in the open position.

Wheels 50 and 52 are mounted for rotational movement to side walls 8 and 10, respectively, such that the axis of rotation of wheel 50 is coaxial with the axis of rotation of wheel 52. As shown, wheels 50 and 52 are mounted off center of the axis of storage cart 1 such that they are disposed closer to back wall 6 than front wall 4. A handle 40 is secured to the outside surface of back wall 6 at pivots 44 and 46. Handle 40 can be pivoted between a first retracted position shown in FIG. 2 where it is out of the way of a user during use of the tanks and an extended position shown in FIG. 6 where it can be used to tilt storage cart onto wheels 50 and 52 for transport.

A platform 60 extends from the bottom edge of front wall 4 and includes projections 63 and 64 that extend from the bottom thereof and form legs to hold the cart in a level position when it is at rest on a horizontal surface. The projections 63 and 64 prevent the cart from tipping forward as a result of the rearward positioning of wheels 50 and 52. A hose compartment door 66 is pivotably connected between flange portions 60a and 60b of platform 60 and includes front wall 68, side walls 70 and 72, top wall 74 and bottom wall 76 that are dimensioned so as to define a hose compartment between the door 66 and front wall 4 of cart 1. Latches 71 and 73 lock the door in the closed position. On the exterior of door 66 are a plurality of bumpers 84 dimensioned to rest on the same surface as wheels 50 and 52 when the door is opened such that the door is supported in a position substantially parallel to the surface with easy access provided to both the hose and to the inside of the door. Located on side walls 70 and 72 are hose slots 79 and 81 that allow access to the interior of the hose storage compartment when the door is closed to allow the hose to be unwound from the support 80 without opening the door 66.

Figure 8:
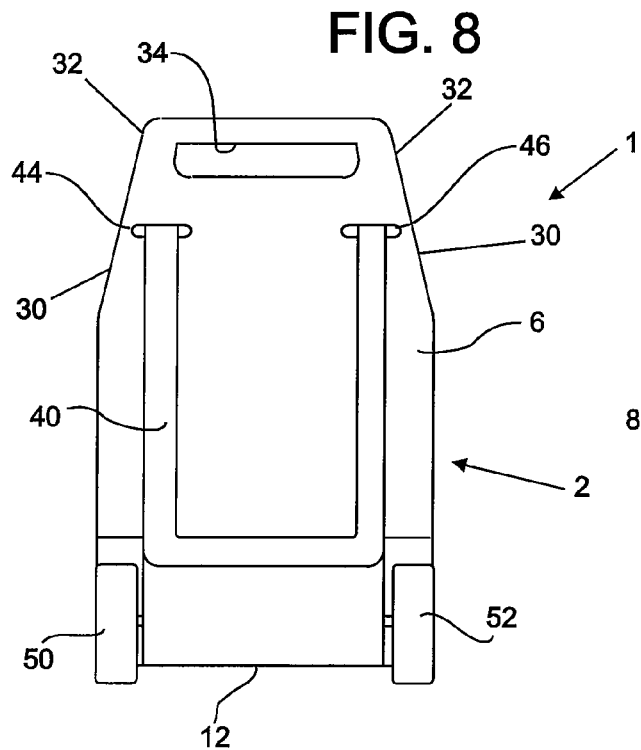
FIG. 8 is a back view of an embodiment of the tank storage cart of the invention.
Figure 9:
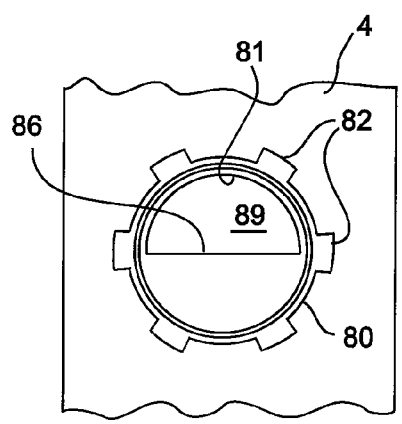
FIG. 9 is a front view showing an alternative embodiment of the hose storage rack used in the tank storage cart of the invention.

Mounted on front wall 4 is a hose storage rack 78 that consists of an annular support 80 mounted to front wall 4 that retains the hose in a wound state. Specifically, the hoses used with tanks 16 and 18 are wound on hose support 80 and maintained on the support by radially extending flanges 82. In one embodiment hose support 80 is stationary and the hose is simply wound around the support. In another embodiment hose support 80 rotates such that the support acts as a reel for winding and unwinding the hose. As best shown in FIG. 8, to provide the movable reel, hose support 80 could be movably mounted on a separate annular spindle 81 that is fixed to the front face 4 such that the support 80 may rotate on the fixed spindle 81. Located within the hose support 80 or spindle 81 is a storage compartment 89 that is defined by a wall 86 that covers the lower half of the cylindrical volume defined by annular support 80 or spindle 81. The space defined by wall 86, annular support 80 or spindle 81, and front wall 4 can be used to store a variety of ancillary equipment in a very space efficient manner. Slots 83 and 85 are formed in front wall 4 to receive torch handles or the like.

A plurality of tool storage slots 87 are formed on the interior of hose compartment door 66 for storing related equipment such as torch heads. In one embodiment, a foam insert 88 is attached to the inside surface of door 66 having slots 87 shaped to receive the tool accessories. Slot 91 is also formed in the upper edge of the front wall 4 to retain the tank key for tanks 16 and 18.

In the illustrated embodiment, side wall 10 supports a plurality of elongated vertical pockets 90 having a circular cross-section that may store brazing rods or other elongated articles. In one embodiment pocket 90 may be made integrally with side wall 10. Brazing rods are typically stored in an elongated plastic container, not shown, where the rods and storage container may be inserted vertically into pockets 90. In addition to pockets 90 other storage compartments may be provided on cart 1 to facilitate the storage and transport of tools, accessories, equipment or the like. A plurality of open pockets 94 may be provided on side wall 8 and may be used to store solder, flux, markers, channel pliers, pipe cutters or the like. In one embodiment pockets 94 may be made integrally with side wall 8.

Figure 1:
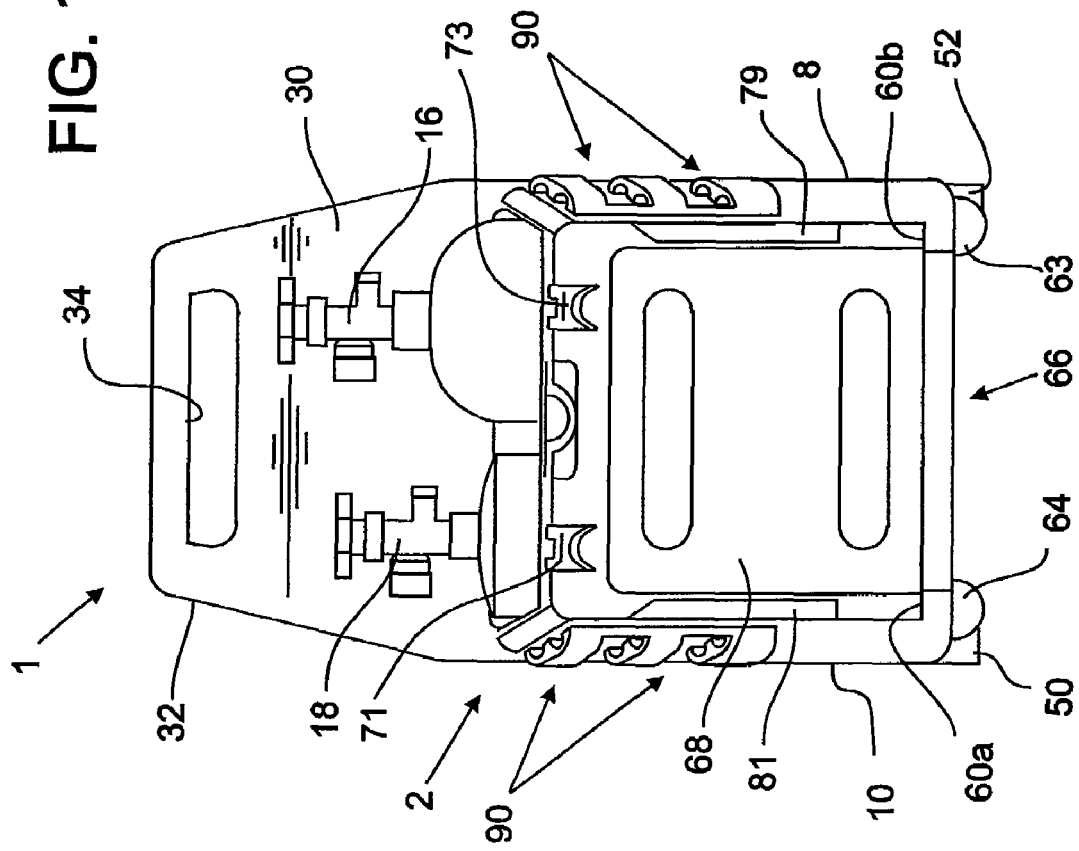
FIG. 1 is a front view of an embodiment of the tank storage cart of the invention.
Figure 4:
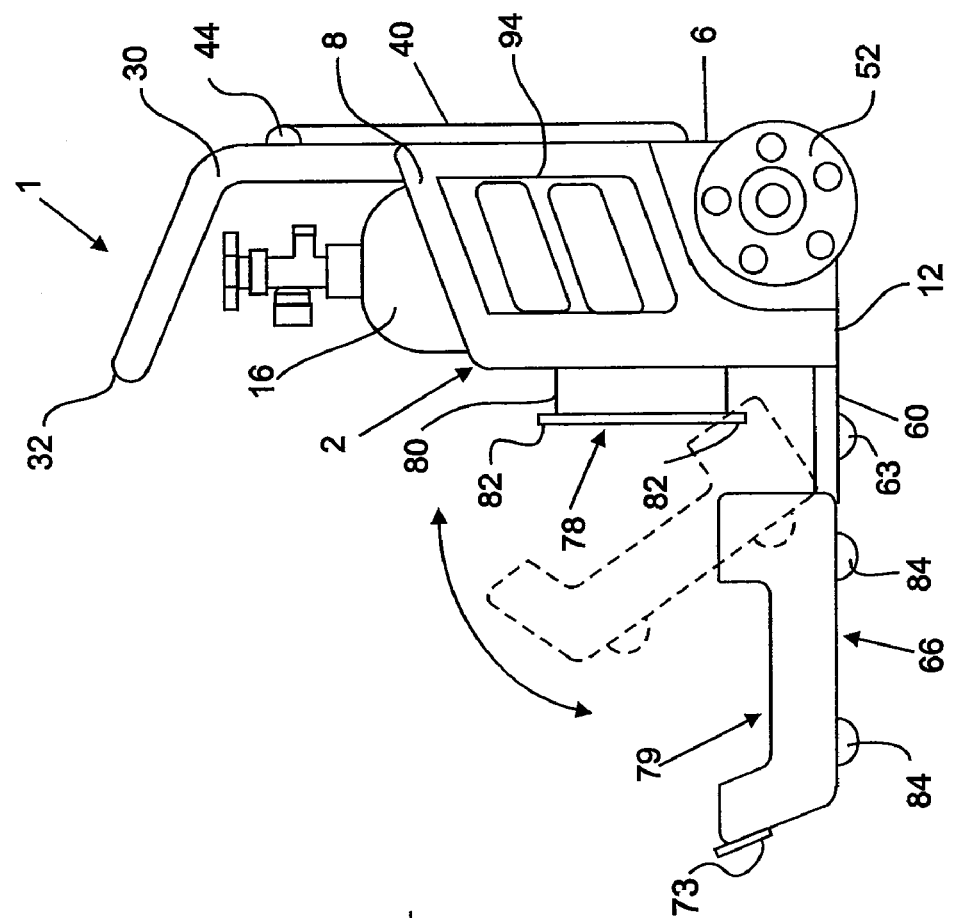
FIG. 4 is a side view of an embodiment of the tank storage cart of the invention with the hose compartment door in the open position.
Figure 3:
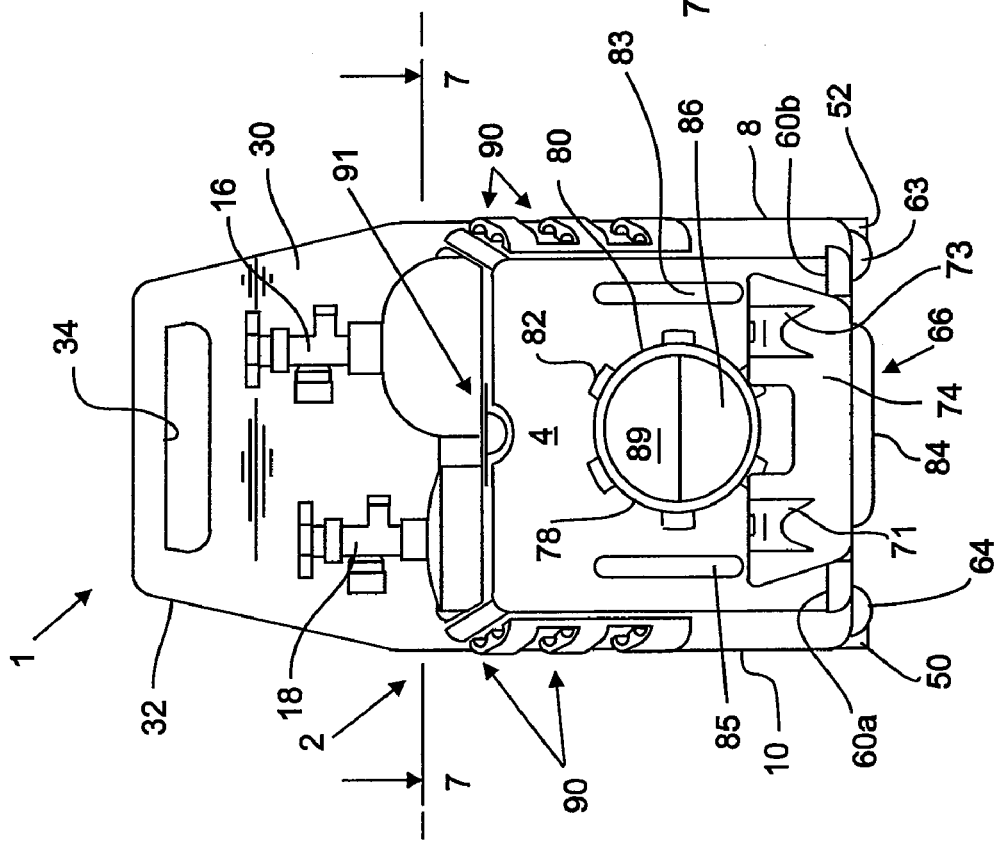
FIG. 3 is a front view of an embodiment of the tank storage cart of the invention with the hose compartment door in the open position.
Figure 10:
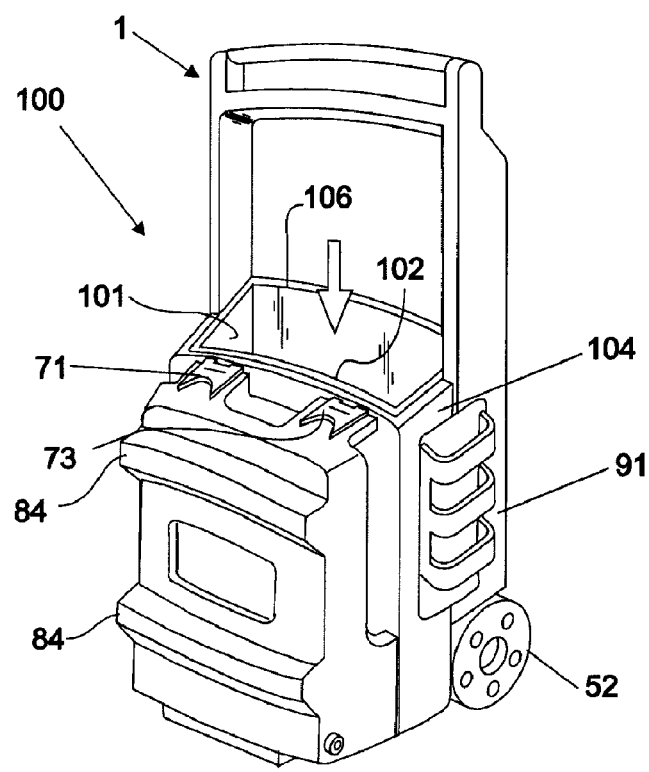
FIG. 10 is a perspective view showing an alternative embodiment of the tank storage cart of the invention.
Figure 10A:
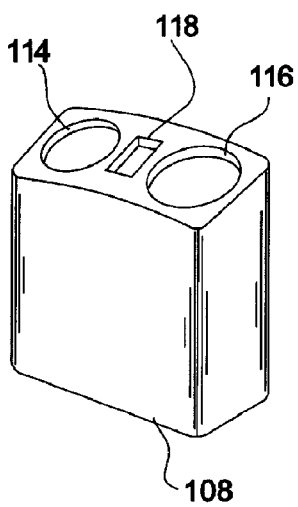
FIGS. 10A-10C are perspective views showing carriers used with the tank storage cart of FIG. 10.
Figure 10B:
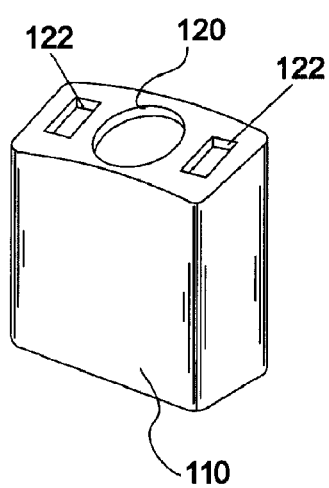
Figure 10C:
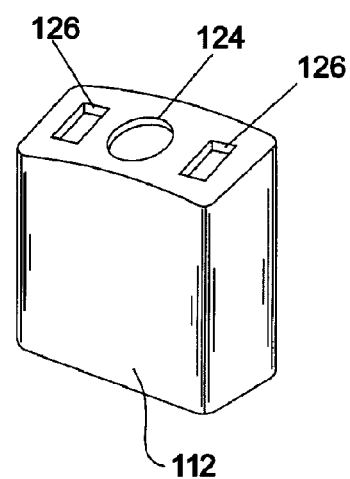

Another embodiment of the tank storage cart of the invention is shown generally at 100 in FIG. 10 and is similar to the embodiment illustrated in FIG. 1 except that tank compartment 14 is replaced by a carrier compartment 101 formed by the front wall 102, side walls 104 and back wall 106. Carrier compartment 101 receives one of a plurality of different carriers 108, 110 or 112, as shown in FIGS. 10A-10C. While three different carriers are illustrated it will be understood that any number of carriers could be provided. Each carrier defines receptacles specifically configured and dimensioned to receive a particular type or size tank and/or other equipment. In the illustrated examples, carrier 108 has a first tank compartment 114 dimensioned to receive an acetylene tank and a second tank compartment 116 dimensioned to receive an oxygen tank. A receptacle 118 is provided for receiving a flint striker or other equipment. Carrier 110 has a tank compartment 120 dimensioned to receive a "B" acetylene tank and two other receptacles 122 for receiving other equipment. Carrier 112 has a tank compartment 124 dimensioned to receive a "MC" acetylene tank and two other receptacles 126 for receiving other equipment. The outside of the carriers 108, 110 and 112 have the same dimensions and are slidably inserted into and removed from carrier compartment 101 such that different carriers designed for different applications can be easily inserted into or removed from the same cart. In this manner a single cart can be used to securely store and transport a variety of different size and type tanks simply by inserting the appropriate carrier into compartment 101.

The system of the invention facilitates the storage and transport of compressed fluid storage tanks and accessories and tools used with such tanks. While embodiments of the invention are disclosed herein, various changes and modifications can be made without departing from the spirit and scope of the invention. The scope of the invention is indicated in the appended claims, and all changes that come within the meaning and range of equivalents are intended to be embraced therein.

What is claimed is:

1. A transport device for tanks comprising:
   a body portion defining a tank storage area for storing at least one tank, said body portion including a front wall and being supported on wheels such that the body portion can be rolled on a surface;
   a door including a front wall, two side walls, a top wall, and a bottom wall, to define a volume with an opening opposite the front wall of the door, the door being pivotably connected to said body portion and movable between a first position where the door engages the front wall of the body portion to define a storage compartment and the front wall of the door is generally parallel to the body portion, and a second position where the front wall of the door is disposed generally parallel to the surface; and
   storage areas formed in said door for equipment associated with the at least one tank, wherein the volume defined by the door and the front wall of the body portion forms the entire storage compartment.

2. The transport device according to claim 1 wherein the body portion supports a protrusion such that the device is supported on said wheels and said protrusion on the surface in a substantially level position.

3. The transport device according to claim 1 wherein said storage area includes slots formed in the inside surface of the door.

4. The transport device according to claim 1 wherein the door includes bumpers for supporting the door in said second position.

5. The transport device according to claim 1 further including a handle pivotably connected to said body portion.

6. The transport device according to claim 5 including two wheels, said two wheels being coaxially aligned such that the body portion can be tilted by said handle and rolled on the two wheels.

7. The transport device according to claim 1 wherein the tank storage area stores two tanks.

8. The transport device according to claim 1 further including a cover portion disposed over the at least one tank when the at least one tank is in the tank storage area.

9. The transport device according to claim 8 wherein said cover includes a hand grip.

10. The transport device according to claim 1 further including a storage compartment located externally of said hose storage compartment.

11. The transport device according to claim 10 wherein said storage compartment includes an upwardly opening receptacle for receiving at least one brazing rod.

12. The transport device according to claim 1 wherein the tank storage area defines a compartment for receiving one of a plurality of carriers, at least two of the plurality of carriers having compartments of different dimensions.

13. A transport device for tanks comprising:
a body portion defining a tank storage area for storing at least one tank, said body portion including a front wall and being supported on wheels such that the body portion can be rolled on a surface;
a door including a front wall, two side walls, a top wall, and a bottom wall, to define a volume with an opening opposite the front wall of the door, the door being pivotably connected to said body portion and movable between a first position where the door engages the front wall of the body portion to define a storage compartment and the front wall of the door is generally parallel to the body portion, and a second position where the front wall of the door is disposed generally parallel to the surface:
storage areas formed in said door for equipment associated with the at least one tank, and
a hose storage rack in said compartment for storing a hose used with the at least one tank in a wound state.

14. The transport device according to claim 13 wherein the hose storage rack is mounted for rotational movement.

15. The transport device according to claim 13 wherein the interior of the compartment can be accessed when the door is in the first position.

16. The transport device according to claim 13 further including a storage compartment in said hose storage rack.

17. A transport device for tanks comprising:
a body portion defining a tank storage area for storing at least one tank, said body portion including a front wall and being supported on wheels such that the body portion can be rolled on a surface;
a door including a front wall, two side walls, a top wall, and a bottom wall, to define a volume with an opening opposite the front wall of the door, the door being pivotably connected to said body portion and movable between a first position where the door engages the front wall of the body portion to define a storage compartment and the front wall of the door is generally parallel to the body portion, and a second position where the front wall of the door is disposed generally parallel to the surface; and
a hose storage rack in said storage compartment for storing a hose used with the at least one tank in a wound state.

18. A transport device for tanks comprising:
a body portion defining a tank storage area for storing at least one tank, said body portion including a front wall and being supported on wheels such that the body portion can be rolled on a surface;
a door including a front wall, two side walls, a top wall, and a bottom wall, to define a volume with an opening opposite the front wall of the door, the door being pivotably connected to said body portion and movable between a first position where the door engages the front wall of the body portion to define a first storage compartment and the front wall of the door is generally parallel to the body portion, and a second position where the front wall of the door is disposed generally parallel to the surface;
a handle pivotably connected to said body portion where the handle in a first position is used to pivot the body portion on said wheels such that the device can be rolled using the handle; and
a plurality of additional storage compartments integral with a side wall of the body portion for storing equipment associated with the at least one tank, wherein the volume defined by the door and the front wall of the body portion forms the entire storage compartment.

19. A transport device for tanks comprising:
a body portion defining a tank storage area for storing at least one tank, said body portion including a front wall and being supported on wheels such that the body portion can be rolled on a surface;
a door including a front wall, two side walls, a top wall, and a bottom wall, to define a volume with an opening opposite the front wall of the door, the door being pivotably connected to said body portion and movable between a first position where the door engages the front wall of the body portion to define a storage compartment and the front wall of the door is generally parallel to the body portion, and a second position where the front wall of the door is disposed generally parallel to the surface, said door including storage for equipment associated with the at least one tank;
a handle pivotably connected to said body portion where the handle in a first position is used to pivot the body portion on said wheels such that the device can be rolled using the handle; and
a hose storage rack in said storage compartment for storing a hose used with the at least one tank in a wound state.

20. A transport device for tanks comprising:
a body portion defining a tank storage area for storing at least one tank, said body portion including a front wall and being supported on wheels such that the body portion can be rolled on a surface;
a door including a front wall, two side walls, a top wall, and a bottom wall, to define a volume with an opening opposite the front wall of the door, the door being pivotably connected to said body portion and movable between a first position where the door engages the front wall of the body portion to define a storage compartment and the front wall of the door is generally parallel to the body portion, and a second position where the front wall of the door is disposed generally parallel to the surface; and
a hose storage rack in said storage compartment for storing a hose used with the at least one tank in a wound state, wherein there is at least one slot in a side wall to allow the hose to be unwound with the door in the first position.

* * * * *